(12) United States Patent
Matsubara et al.

(10) Patent No.: US 12,036,614 B2
(45) Date of Patent: Jul. 16, 2024

(54) CUTTING INSERT

(71) Applicant: Sumitomo Electric Hardmetal Corp., Itami (JP)

(72) Inventors: Kouki Matsubara, Itami (JP); Tomoyuki Fukuyama, Itami (JP); Shota Takemura, Itami (JP); Shota Tsujimoto, Itami (JP); Naoki Matsuda, Itami (JP)

(73) Assignee: SUMITOMO ELECTRIC HARDMETAL CORP., Itami (JP)

( * ) Notice: Subject to any disclaimer, the term of this patent is extended or adjusted under 35 U.S.C. 154(b) by 425 days.

(21) Appl. No.: 17/440,798

(22) PCT Filed: Mar. 24, 2020

(86) PCT No.: PCT/JP2020/012971
§ 371 (c)(1),
(2) Date: Sep. 20, 2021

(87) PCT Pub. No.: WO2020/196501
PCT Pub. Date: Oct. 1, 2020

(65) Prior Publication Data
US 2022/0161334 A1      May 26, 2022

(30) Foreign Application Priority Data
Mar. 27, 2019      (JP) .................................. 2019-060276

(51) Int. Cl.
*B23C 5/20*      (2006.01)
*B23B 27/16*     (2006.01)
*B23C 5/10*      (2006.01)

(52) U.S. Cl.
CPC .......... *B23B 27/1607* (2013.01); *B23C 5/202* (2013.01); *B23C 2200/0494* (2013.01);
(Continued)

(58) Field of Classification Search
CPC ............. B23C 5/202; B23C 2200/0411; B23C 2200/083; B23C 2200/085;
(Continued)

(56) References Cited

U.S. PATENT DOCUMENTS 5,593,255 A * 1/1997 Satran ..................... B23C 5/109
407/116
6,142,716 A * 11/2000 Jordberg ................. B23C 5/202
407/115
(Continued)

FOREIGN PATENT DOCUMENTS

EP      2 774 706 A1    9/2014
EP      3 067 134 A1    9/2016
(Continued)

*Primary Examiner* — Sara Addisu
(74) *Attorney, Agent, or Firm* — XSENSUS LLP

(57) ABSTRACT

A ridgeline between the top surface and the side surface includes: a nose cutting edge portion having a curved line shape, the nose cutting edge portion having a first end and a second end opposite to the first end; a major cutting edge portion contiguous to the first end; and a wiper cutting edge portion contiguous to the second end. The top surface includes: a first rake face contiguous to the wiper cutting edge portion; a second rake face contiguous to the major cutting edge portion; and a third rake face contiguous to the nose cutting edge portion and contiguous to each of the first rake face and the second rake face. A boundary line between the second rake face and the third rake face is separated from the first end and is contiguous to the major cutting edge portion.

6 Claims, 6 Drawing Sheets

(52) U.S. Cl.
CPC .. *B23C 2200/085* (2013.01); *B23C 2200/208* (2013.01); *B23C 2200/287* (2022.02); *B23C 2200/365* (2013.01)

(58) Field of Classification Search
CPC ........ B23C 2200/203; B23C 2200/208; B23C 2200/287; B23C 2200/291; B23C 2200/365; B23C 5/109; B23C 2200/286; B23C 2200/164; B23C 2200/0494; B23B 27/1607
See application file for complete search history.

(56) References Cited

U.S. PATENT DOCUMENTS

| | | | | |
|---|---|---|---|---|
| 6,196,770 | B1 * | 3/2001 | Astrom | B23C 5/109 |
| | | | | 407/43 |
| 7,004,689 | B2 * | 2/2006 | DeRoche | B23C 5/109 |
| | | | | 407/67 |
| 7,040,844 | B1 * | 5/2006 | Daiguji | B23C 5/2213 |
| | | | | 407/113 |
| 7,281,884 | B2 * | 10/2007 | Maeda | B23C 5/109 |
| | | | | 407/42 |
| 10,512,975 | B2 * | 12/2019 | Roman | B23C 5/109 |
| 2006/0013661 | A1 * | 1/2006 | Long | B23C 5/2213 |
| | | | | 407/113 |
| 2007/0258778 | A1 | 11/2007 | Waggle | |
| 2013/0045061 | A1 * | 2/2013 | Ishi | B23C 5/202 |
| | | | | 407/100 |
| 2013/0108388 | A1 * | 5/2013 | Ishi | B23C 5/109 |
| | | | | 407/113 |
| 2013/0115022 | A1 * | 5/2013 | Ishi | B23C 5/202 |
| | | | | 407/100 |
| 2017/0008099 | A1 * | 1/2017 | Touma | B23C 5/109 |
| 2017/0297116 | A1 | 10/2017 | Sakai | |
| 2017/0304911 | A1 * | 10/2017 | Kumoi | B23C 5/20 |
| 2018/0154464 | A1 | 6/2018 | Ishi | |
| 2019/0061024 | A1 | 2/2019 | Shiroma | |
| 2019/0210124 | A1 * | 7/2019 | Slusarcyk | B23C 5/109 |
| 2019/0283149 | A1 * | 9/2019 | Touma | B23C 5/20 |
| 2020/0361010 | A1 * | 11/2020 | Ishi | B23C 5/205 |
| 2023/0132425 | A1 * | 5/2023 | Nishikoori | B23C 5/109 |
| | | | | 407/113 |
| 2023/0278115 | A1 * | 9/2023 | Kakai | B23C 5/109 |
| | | | | 407/113 |
| 2023/0294183 | A1 * | 9/2023 | Nishikoori | B23C 5/06 |
| | | | | 409/131 |

FOREIGN PATENT DOCUMENTS

| | | | | |
|---|---|---|---|---|
| EP | 3 100 811 A1 | 12/2016 | | |
| JP | 2007-44779 A | 2/2007 | | |
| JP | 2008-194793 A | 8/2008 | | |
| JP | 2013-091152 A | 5/2013 | | |
| JP | 2014-46444 A | 3/2014 | | |
| JP | 2016-30298 A | 3/2016 | | |
| JP | 2017-164900 A | 9/2017 | | |
| JP | 2019-042816 A | 3/2019 | | |
| WO | 2012/046556 A1 | 4/2012 | | |
| WO | 2014/196573 A1 | 12/2014 | | |
| WO | 2015/080168 A1 | 6/2015 | | |
| WO | 2016/043029 A1 | 3/2016 | | |
| WO | WO-2016060195 A1 * | 4/2016 | ............ | B23C 5/109 |
| WO | WO-2020196526 A1 * | 10/2020 | ......... | B23B 27/1611 |

* cited by examiner

CUTTING INSERT

CROSS-REFERENCE TO RELATED APPLICATIONS

The present application is based on PCT filing PCT/JP2020/012971, filed Mar. 24, 2020, which claims priority to JP 2019-060276, filed Mar. 27, 2019, the entire contents of each are incorporated herein by reference.

TECHNICAL FIELD

The present disclosure relates to a cutting insert. The present application claims a priority based on Japanese Patent Application No. 2019-060276 filed on Mar. 27, 2019, the entire content of which is incorporated herein by reference.

BACKGROUND ART

Japanese Patent Laying-Open No. 2007-44779 (PTL 1) discloses a throwaway tip (cutting insert) and a milling cutter using the cutting insert.

CITATION LIST

Patent Literature

PTL 1: Japanese Patent Laying-Open No. 2007-44779

SUMMARY OF INVENTION

A cutting insert according to the present disclosure includes a top surface, a bottom surface, and a side surface. The bottom surface is opposite to the top surface. The side surface is contiguous to each of the top surface and the bottom surface. A ridgeline between the top surface and the side surface includes: a nose cutting edge portion having a curved line shape, the nose cutting edge portion having a first end and a second end opposite to the first end; a major cutting edge portion contiguous to the first end; and a wiper cutting edge portion contiguous to the second end. The top surface includes: a first rake face contiguous to the wiper cutting edge portion; a second rake face contiguous to the major cutting edge portion; and a third rake face contiguous to the nose cutting edge portion and contiguous to each of the first rake face and the second rake face. A boundary line between the second rake face and the third rake face is separated from the first end and is contiguous to the major cutting edge portion.

DETAILED DESCRIPTION

Figure 1:
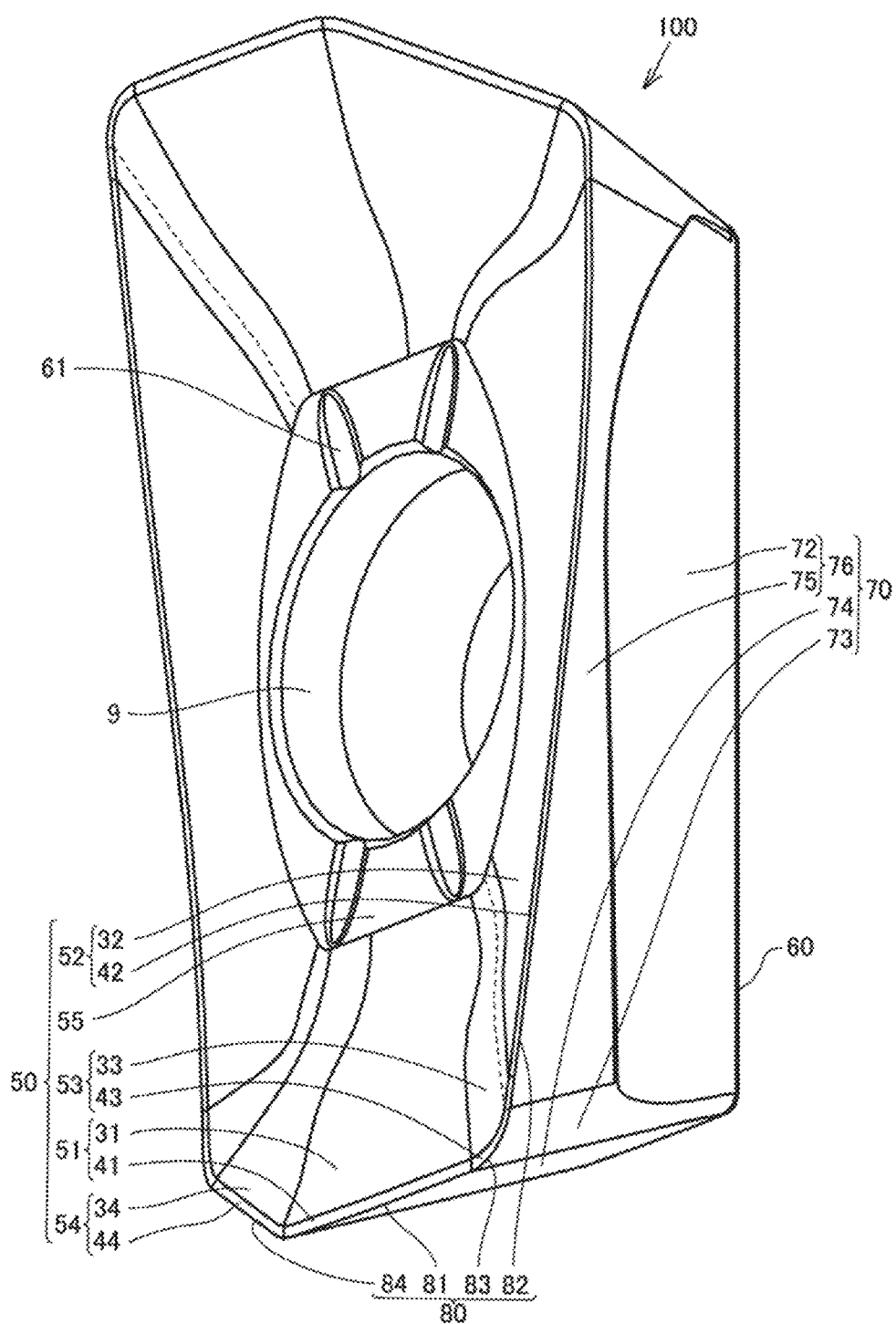
FIG. 1 is a schematic perspective view showing a configuration of a cutting insert according to the present embodiment.

Problem to be Solved by the Present Disclosure

It has been required to further improve breakage resistance in a cutting insert.

It is an object of the present disclosure to provide a cutting insert having improved breakage resistance.

Advantageous Effect of the Present Disclosure

According to the present disclosure, a cutting insert having improved breakage resistance can be provided.

DESCRIPTION OF EMBODIMENTS

First, embodiments of the present disclosure are listed and described.

(1) A cutting insert 100 according to the present disclosure includes a top surface 50, a bottom surface 60, and a side surface 70. Bottom surface 60 is opposite to top surface 50. Side surface 70 is contiguous to each of top surface 50 and bottom surface 60. A ridgeline 80 between top surface 50 and side surface 70 includes: a nose cutting edge portion 83 having a curved line shape, nose cutting edge portion 83 having a first end 86 and a second end 85 opposite to first end 86; a major cutting edge portion 82 contiguous to first end 86; and a wiper cutting edge portion 81 contiguous to second end 85. Top surface 50 includes: a first rake face 51 contiguous to wiper cutting edge portion 81; a second rake face 52 contiguous to major cutting edge portion 82; and a third rake face 53 contiguous to nose cutting edge portion 83 and contiguous to each of first rake face 51 and second rake face 52. A boundary line 3 between second rake face 52 and third rake face 53 is separated from first end 86 and is contiguous to major cutting edge portion 82.

(2) According to cutting insert 100 according to (1), third rake face 53 may have a first region 1 contiguous to first rake face 51 and a second region 2 contiguous to second rake face 52. In a cross section perpendicular to bottom surface 60 and intersecting each of major cutting edge portion 82 and wiper cutting edge portion 81, first region 1 may have a protruding shape and second region 2 may have a recessed shape.

(3) According to cutting insert 100 according to (1) or (2), a first distance D1 may be 1.2 or more times and 6 or less times as large as a second distance D2, first distance D1 being defined as a distance between second end 85 and a boundary point 4 between boundary line 3 and major cutting edge portion 82 in a direction parallel to bottom surface 60 and parallel to major cutting edge portion 82 when viewed in a direction perpendicular to bottom surface 60, second distance D2 being defined as a distance between second end 85 and first end 86 in the direction parallel to bottom surface 60 and parallel to major cutting edge portion 82 when viewed in the direction perpendicular to bottom surface 60.

(4) According to cutting insert 100 according to (3), in a cross section perpendicular to bottom surface 60 and inclined by 25° with respect to wiper cutting edge portion 81, third rake face 53 may be provided with a recess having an arc shape, and a curvature radius R of the recess may be 0.5 or more times as large as first distance D1.

(5) According to cutting insert 100 according to any one of (1) to (4), a rake angle of second rake face 52 may be larger than a rake angle of first rake face 51.

Details of Embodiments of the Present Disclosure

Next, embodiments of the present disclosure will be described in detail with reference to figures. It should be noted that in the figures described below, the same or corresponding portions are denoted by the same reference characters, and will not be described repeatedly.

First, a configuration of a cutting insert 100 according to the present embodiment will be described. FIG. 1 is a schematic perspective view showing the configuration of cutting insert 100 according to the present embodiment.

As shown in FIG. 1, cutting insert 100 mainly has a top surface 50, a bottom surface 60, and a side surface 70. Bottom surface 60 is opposite to top surface 50. Bottom surface 60 is a flat surface. Side surface 70 is contiguous to each of top surface 50 and bottom surface 60. Side surface 70 has a circular shape. Cutting insert 100 is provided with an insert mounting hole 9. Insert mounting hole 9 is a through hole that opens in each of top surface 50 and bottom surface 60.

A ridgeline 80 between top surface 50 and side surface 70 includes a major cutting edge portion 82, a nose cutting edge portion 83, a wiper cutting edge portion 81, and a sub cutting edge portion 84. Side surface 70 has a first side surface region 74, a second side surface region 76, and a third side surface region 73. First side surface region 74 is contiguous to each of wiper cutting edge portion 81 and sub cutting edge portion 84. Second side surface region 76 is contiguous to major cutting edge portion 82. Second side surface region 76 has a first side surface portion 72 and a second side surface portion 75. Third side surface region 73 is contiguous to nose cutting edge portion 83.

First side surface portion 72 is located between bottom surface 60 and second side surface portion 75. First side surface portion 72 is contiguous to, for example, each of second side surface portion 75 and third side surface region 73. Third side surface region 73 is located between first side surface region 74 and second side surface region 76. Third side surface region 73 is contiguous to each of first side surface region 74 and second side surface region 76. Third side surface region 73 is located between first side surface region 74 and first side surface portion 72. Third side surface region 73 is located between first side surface region 74 and second side surface portion 75.

Figure 2:
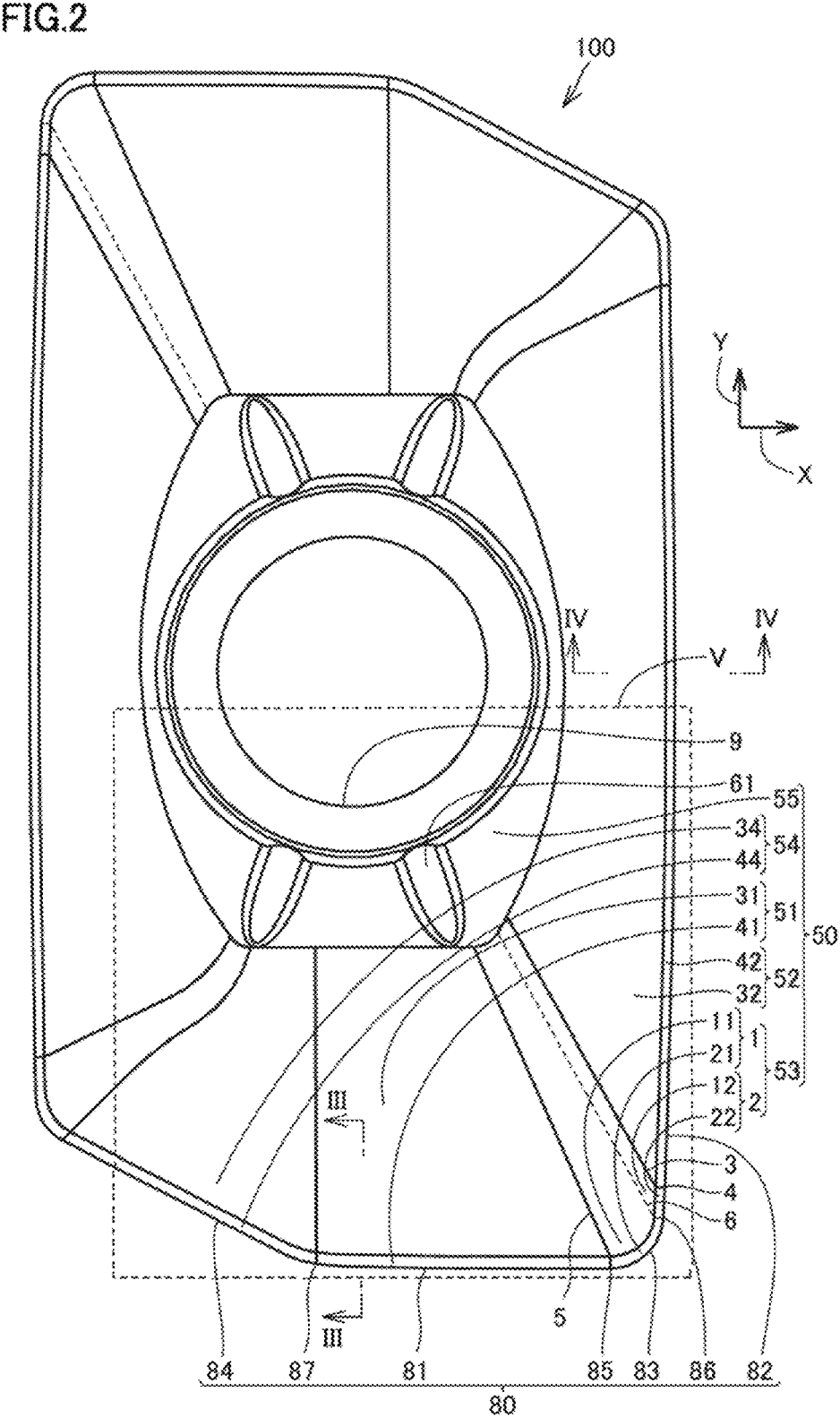
FIG. 2 is a schematic plan view showing the configuration of the cutting insert according to the present embodiment.

FIG. 2 is a schematic plan view showing the configuration of cutting insert 100 according to the present embodiment. FIG. 2 is a diagram of top surface 50 when viewed in a direction perpendicular to bottom surface 60. Each of wiper cutting edge portion 81 and major cutting edge portion 82 has a curved line shape, for example. Sub cutting edge portion 84 has a straight line shape, for example. Sub cutting edge portion 84 may have a curved line shape. As shown in FIG. 2, when viewed in the direction perpendicular to bottom surface 60, each of wiper cutting edge portion 81, major cutting edge portion 82, and sub cutting edge portion 84 may have a straight line shape. Nose cutting edge portion 83 has a curved line shape. Nose cutting edge portion 83 has a first end 86 and a second end 85 opposite to first end 86. Major cutting edge portion 82 is contiguous to one end (first end 86) of nose cutting edge portion 83. Wiper cutting edge portion 81 is contiguous to the other end (second end 85) of nose cutting edge portion 83. Nose cutting edge portion 83 is located between major cutting edge portion 82 and wiper cutting edge portion 81.

One end of wiper cutting edge portion 81 is the other end (second end 85) of nose cutting edge portion 83. The other end (third end 87) of wiper cutting edge portion 81 is contiguous to sub cutting edge portion 84. When viewed in the direction perpendicular to bottom surface 60, cutting insert 100 extends along a long side direction V and a short side direction X. Major cutting edge portion 82 extends along long side direction Y. Wiper cutting edge portion 81 extends along short side direction X. The extending direction of major cutting edge portion 82 is inclined by an angle of substantially 90° with respect to the extending direction of wiper cutting edge portion 81. Sub cutting edge portion 84 is inclined to the insert mounting hole 9 side with respect to wiper cutting edge portion 81. The extending direction of sub cutting edge portion 84 is inclined by an angle of more than 0° and less than 90° with respect to the extending direction of wiper cutting edge portion 81. Sub cutting edge portion 84 is inclined with respect to each of long side direction Y and short side direction X.

Top surface 50 has a first rake face 51, a second rake face 52, a third rake face 53, a fourth rake face 54, and a central flat portion 55. First rake face 51 is contiguous to wiper cutting edge portion 81. First rake face 51 has a first land portion 41 and a first rake face portion 31. First land portion 41 is contiguous to wiper cutting edge portion 81. First rake face portion 31 is contiguous to first land portion 41. As shown in FIG. 2, when viewed in the direction perpendicular to bottom surface 60, first land portion 41 is located between first rake face portion 31 and wiper cutting edge portion 81.

Second rake face 52 is contiguous to major cutting edge portion 82. Second rake face 52 has a second land portion 42 and a second rake face portion 32. Second land portion 42 is contiguous to major cutting edge portion 82. Second rake face portion 32 is contiguous to second land portion 42. As shown in FIG. 2, when viewed in the direction perpendicular to bottom surface 60, second land portion 42 is located between second rake face portion 32 and major cutting edge portion 82.

Fourth rake face 54 is contiguous to sub cutting edge portion 84. Fourth rake face 54 has a fourth land portion 44 and a fourth rake face portion 34. Fourth land portion 44 is contiguous to sub cutting edge portion 84. Fourth rake face portion 34 is contiguous to fourth land portion 44. As shown in FIG. 2, when viewed in the direction perpendicular to bottom surface 60, fourth land portion 44 is located between fourth rake face portion 34 and sub cutting edge portion 84.

Central flat portion 55 is contiguous to insert mounting hole 9. When viewed in the direction perpendicular to bottom surface 60, central flat portion 55 is located between insert mounting hole 9 and each of first rake face 51, second rake face 52, third rake face 53, and fourth rake face 54. Central flat portion 55 is contiguous to each of first rake face 51, second rake face 52, third rake face 53, and fourth rake face 54. Central flat portion 55 is provided with, for example, four recesses 61. As shown in FIG. 2, when viewed in the direction perpendicular to bottom surface 60, recesses 61 are provided between first rake face 51 and insert mounting hole 9 and are provided between fourth rake face 54 and insert mounting hole 9.

Figure 3:
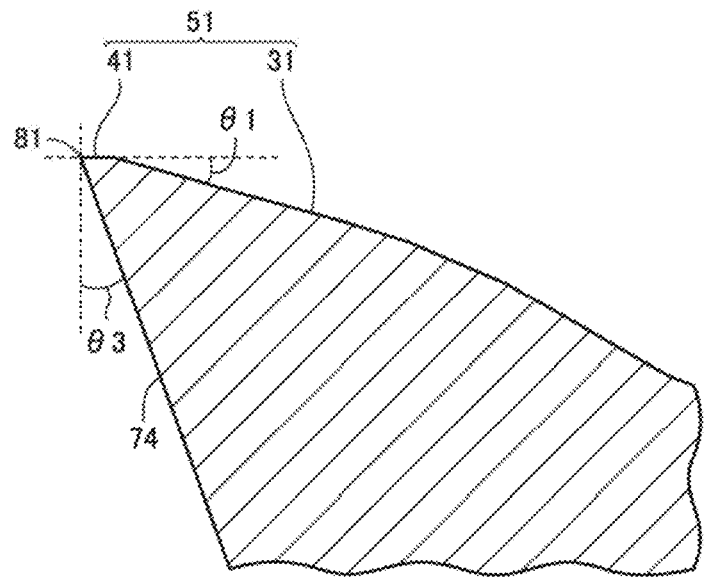
FIG. 3 is a schematic cross sectional view taken along a line III-III in FIG. 2.

FIG. 3 is a schematic cross sectional view taken along a line 111-111 in FIG. 2. FIG. 3 shows a cut surface that is perpendicular to bottom surface 60, that intersects insert mounting hole 9, and that is perpendicular to wiper cutting edge portion 81.

As shown in FIG. 3, first rake face portion 31 is inclined to the bottom surface 60 side with respect to first land portion 41. First rake face 51 has a rake angle (first rake angle θ1). When first rake face 51 has first land portion 41, the rake angle of first rake face 51 is the rake angle of first rake face portion 31. First rake angle θ1 is, for example, more than or equal to 5° and less than or equal to 20°.

First side surface region 74 is contiguous to wiper cutting edge portion 81. First side surface region 74 may be contiguous to sub cutting edge portion 84. First side surface region 74 is inclined to the insert mounting hole 9 side with respect to the plane perpendicular to bottom surface 60. The inclination angle (third inclination angle θ3) of first side surface region 74 with respect to the plane perpendicular to bottom surface 60 is, for example, more than or equal to 10° and less than or equal to 30°. First side surface region 74 is contiguous to bottom surface 60. First side surface region 74 functions as a flank face.

Figure 4:
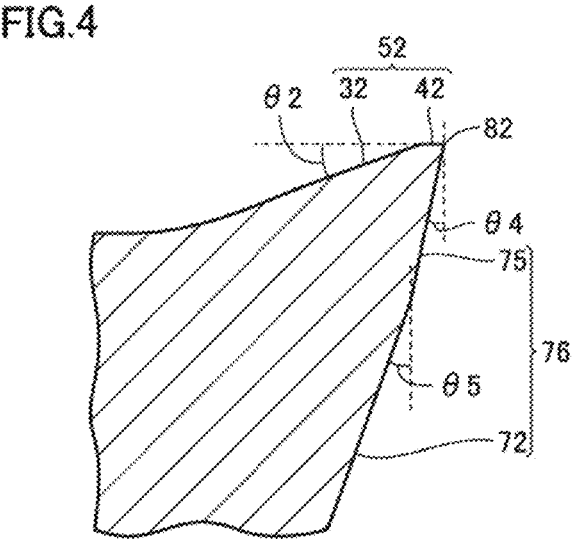
FIG. 4 is a schematic cross sectional view taken along a line IV-IV in FIG. 2.

FIG. 4 is a schematic cross sectional view taken along a line IV-LV in FIG. 2. FIG. 4 shows a cut surface that is perpendicular to bottom surface 60, that intersects insert mounting hole 9, and that is perpendicular to major cutting edge portion 82.

As shown in FIG. 4, second rake face portion 32 is inclined to the bottom surface 60 side with respect to second land portion 42. Second rake face 52 has a rake angle (second rake angle θ2). When second rake face 52 has second land portion 42, the rake angle of second rake face 52 is the rake angle of second rake face portion 32. Second rake angle θ2 is, for example, more than or equal to 10° and less than or equal to 35°. The rake angle (second rake angle θ2) of second rake face 52 may be larger than the rake angle (first rake angle) of first rake face 51.

Second side surface region 76 has a first side surface portion 72 and a second side surface portion 75. Second side surface portion 75 is contiguous to major cutting edge portion 82. Second side surface portion 75 is inclined to the insert mounting hole 9 side with respect to the plane perpendicular to bottom surface 60. First side surface portion 72 is contiguous to second side surface portion 75. First side surface portion 72 is located between second side surface portion 75 and bottom surface 60 in the direction perpendicular to bottom surface 60. First side surface portion 72 is inclined with respect to the plane perpendicular to bottom surface 60. The inclination angle (fifth angle θ5) of first side surface portion 72 with respect to the plane perpendicular to bottom surface 60 is larger than the inclination angle (fourth angle θ4) of second side surface portion 75 with respect to the plane perpendicular to bottom surface 60. Second side surface region 76 functions as a flank face.

Figure 5:
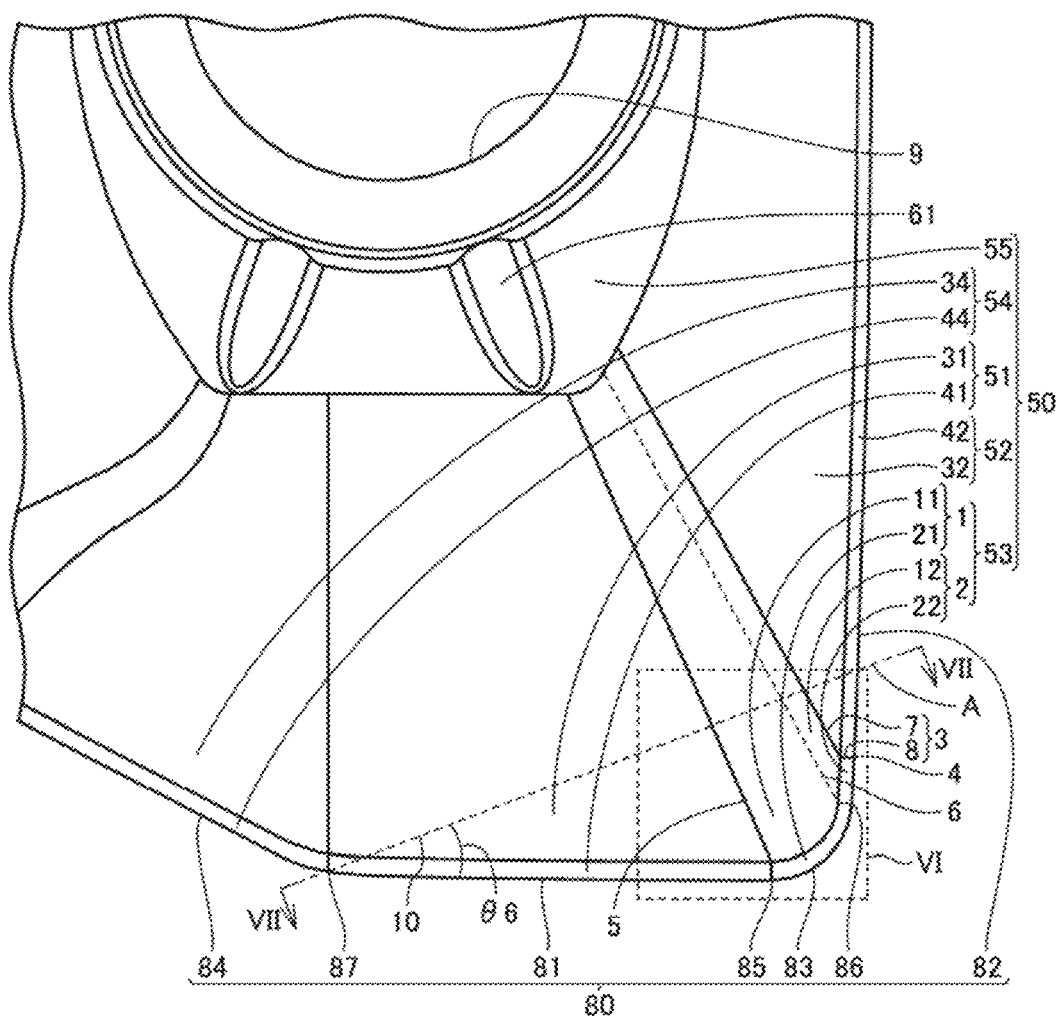
FIG. 5 is an enlarged schematic plan view of a region V in FIG. 2.

FIG. 5 is an enlarged schematic plan view of a region V in FIG. 2. As shown in FIG. 5, a boundary line (first boundary line 5) between first rake face 51 and third rake face 53 is contiguous to second end 85 of nose cutting edge portion 83. On the other hand, a boundary line (second boundary line 3) between second rake face 52 and third rake face 53 is separated from first end 86 of nose cutting edge portion 83. Second boundary line 3 is contiguous to major cutting edge portion 82.

As shown in FIG. 5, third rake face 53 is contiguous to nose cutting edge portion 83. Third rake face 53 has a first region 1 and a second region 2. First region 1 is contiguous to first rake face 51. Second region 2 is contiguous to second rake face 52. First region 1 is located between first rake face 51 and second region 2. Second region 2 is located between second rake face 52 and first region 1. Second region 2 is contiguous to first region 1. First region 1 is contiguous to nose cutting edge portion 83. Second region 2 is contiguous to major cutting edge portion 82. A boundary line (third boundary line 6) between first region 1 and second region 2 may be contiguous to first end 86.

Figure 6:
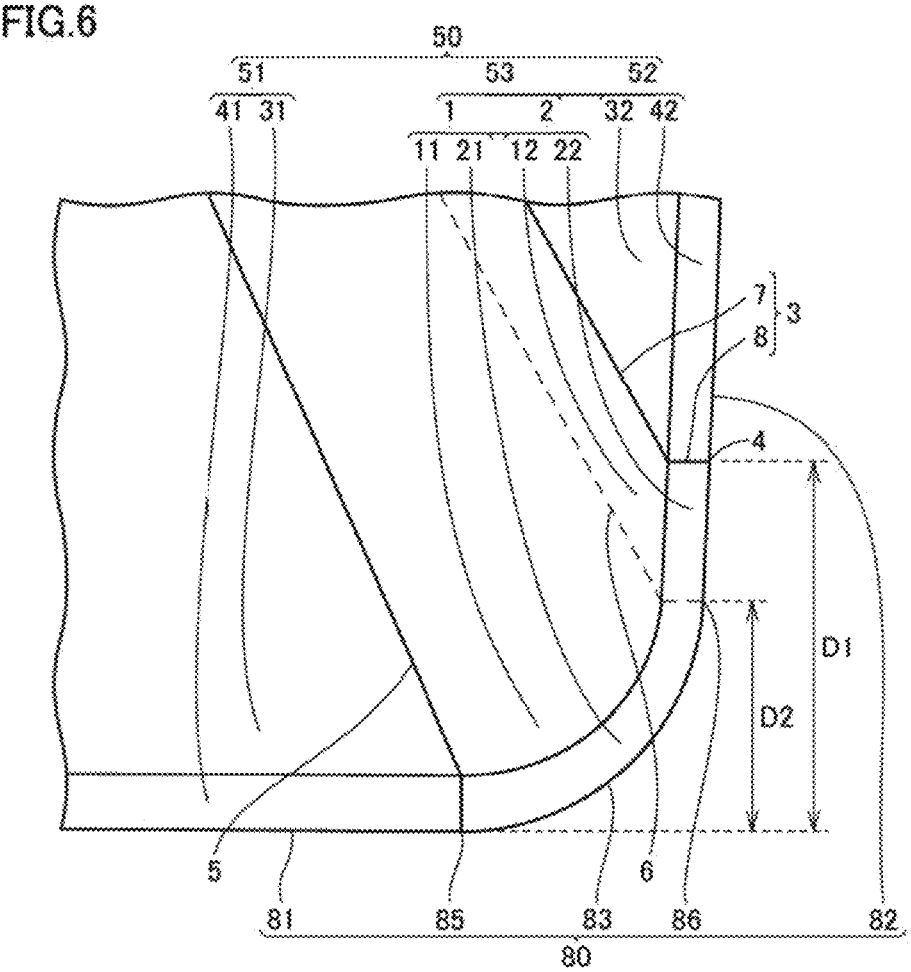
FIG. 6 is an enlarged schematic plan view of a region VI in FIG. 5.

FIG. 6 is an enlarged schematic plan view of a region VI in FIG. 5. As shown in FIG. 6, a boundary line (second boundary line 3) between second rake face 52 and third rake face 53 may include a first straight line portion 7 and a second straight line portion 8. First straight line portion 7 is inclined with respect to each of major cutting edge portion 82 and wiper cutting edge portion 81. Second straight line portion 8 is parallel to wiper cutting edge portion 81. Second straight line portion 8 is contiguous to first straight line portion 7. Second straight line portion 8 is inclined with respect to first straight line portion 7. Second straight line portion 8 is contiguous to major cutting edge portion 82. First straight line portion 7 is contiguous to central flat portion 55 (see FIG. 5).

As shown in FIG. 6, first region 1 has a first region land portion 21 and a first region rake face portion 11. First region land portion 21 is contiguous to nose cutting edge portion 83. First region rake face portion 11 is contiguous to first region land portion 21. First region rake face portion 11 is inclined to the bottom surface 60 side with respect to first region land portion 21. As shown in FIG. 6, first region land portion 21 is located between first region rake face portion 11 and nose cutting edge portion 83 when viewed in the direction perpendicular to bottom surface 60.

As shown in FIG. 6, second region 2 has a second region land portion 22 and a second region rake face portion 12. Second region land portion 22 is contiguous to major cutting edge portion 82. Second region rake face portion 12 is contiguous to second region land portion 22. Second region rake face portion 12 is inclined to the bottom surface 60 side with respect to second region land portion 22. As shown in FIG. 6, second region land portion 22 is located between second region rake face portion 12 and major cutting edge portion 82 when viewed in the direction perpendicular to bottom surface 60.

First region land portion 21 is contiguous to each of first land portion 41 and second region land portion 22. First region land portion 21 is located between first land portion 41 and second region land portion 22. Second region land portion 22 is contiguous to each of second land portion 42 and first region land portion 21. Second region land portion 22 is located between second land portion 42 and first region land portion 21. First straight line portion 7 is a boundary between second region rake face portion 12 and second rake face portion 32. Second straight line portion 8 is a boundary between second land portion 42 and second region land portion 22.

As shown in FIG. 6, a first distance D1 is defined as a distance between second end 85 of nose cutting edge portion 83 and boundary point 4 between second boundary line 3 and major cutting edge portion 82 in the direction parallel to bottom surface 60 and parallel to major cutting edge portion 82 when viewed in the direction perpendicular to bottom surface 60, and a second distance D2 is defined as a distance between second end 85 and first end 86 in the direction parallel to bottom surface 60 and parallel to major cutting edge portion 82 when viewed in the direction perpendicular to bottom surface 60. In this case, first distance D1 is, for example, 1.2 or more times and 6 or less times as large as second distance D2. First distance D1 may be 1.3 or more times as large as second distance D2, or may be 1.4 or more times as large as second distance D2. First distance D1 may be 6 or less times as large as second distance D2, or may be 5.5 or less times as large as second distance D2. It should be noted that when viewed in the direction perpendicular to bottom surface 60, the direction parallel to bottom surface 60 and parallel to major cutting edge portion 82 is a direction parallel to a straight line obtained by projecting, onto a plane including bottom surface 60, a straight line including major cutting edge portion 82.

Figure 7:
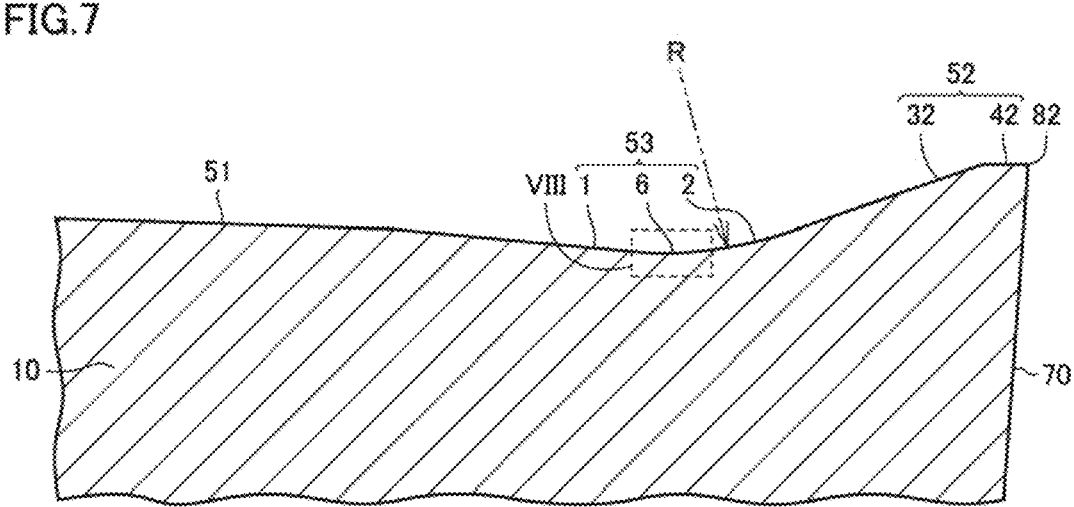
FIG. 7 is a schematic cross sectional view taken along a line VII-VII in FIG. 5.

FIG. 7 is a schematic cross sectional view taken along a line VII-VII in FIG. 5. FIG. 7 shows a cut surface perpendicular to bottom surface 60 and inclined by 25° with respect to wiper cutting edge portion 81. In FIG. 7, the inclination angle (sixth angle θ6) of cut surface 10 with respect to wiper cutting edge portion 81 is 25°. Cut surface 10 may extend through the boundary (third end 87) between wiper cutting edge portion 81 and the sub cutting edge portion, or may intersect wiper cutting edge portion 81. Cut surface 10 intersects major cutting edge portion 82.

Figure 8:
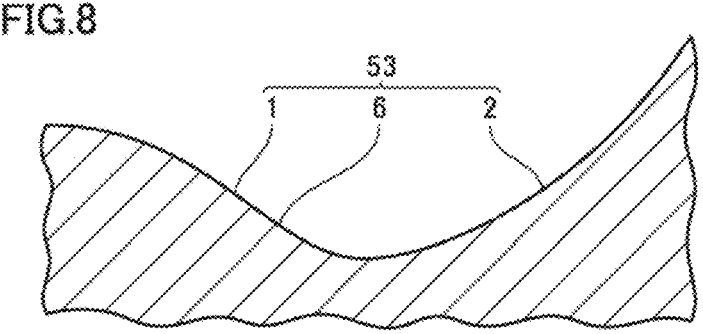
FIG. 8 is an enlarged schematic cross sectional view of a region VIII in FIG. 7.

FIG. 8 is an enlarged schematic cross sectional view of a region VIII in FIG. 7. In FIG. 8, it is illustrated that a ratio of a size in the vertical direction is large with respect to a size in the horizontal direction. As shown in FIG. 8, in cut surface 10 perpendicular to bottom surface 60 and intersecting each of major cutting edge portion 82 and wiper cutting edge portion 81, first region 1 has a protruding shape and second region 2 has a recessed shape. The protruding shape is a shape protruding in a direction from bottom surface 60 toward top surface 50. From another point of view, it can be said that the protruding shape is a shape that is curved outward. The recessed shape is a shape depressed in the direction from top surface 50 toward bottom surface 60. From another point of view, it can be said that the recessed shape is a shape that is curved inward. The boundary line (third boundary line 6) between first region 1 and second region 2 is an inflection point of third rake face 53.

In cut surface 10, first region 1 is a protrusion having an arc shape, and second region 2 is a recess having an arc shape. Curvature radius R of the recess having the arc shape may be 0.5 or more times as large as first distance D1. Curvature radius R of the recess having the arc shape may be 0.6 or more times as large as first distance D1, or may be 0.7 or more times as large as first distance D1.

Second rake face 52 is disposed at a position higher than second region 2 in the direction perpendicular to bottom surface 60. From another point of view, it can be said that the distance between bottom surface 60 and second rake face 52 is larger than the distance between bottom surface 60 and second region 2. First region 1 is disposed at a position lower than first rake face 51 in the direction perpendicular to bottom surface 60. From another point of view, it can be said that the distance between bottom surface 60 and first rake face 51 is larger than the distance between bottom surface 60 and first region 1.

Next, the following describes functions and effects of cutting insert 100 according to the present embodiment.

According to cutting insert 100 of the present embodiment, top surface 50 includes: first rake face 51 contiguous to wiper cutting edge portion 81; second rake face 52 contiguous to major cutting edge portion 82; and third rake face 53 contiguous to nose cutting edge portion 83 and contiguous to each of first rake face 51 and second rake face 52. Boundary line 3 between second rake face 52 and third rake face 53 is separated from first end 86 and is contiguous to major cutting edge portion 82. Thus, the thickness in the vicinity of nose cutting edge portion 83 can be made larger than that in cutting insert 100 in which boundary line 3 between second rake face 52 and third rake face 53 is contiguous to first end 86. Further, when viewed in a cross sectional view, second rake face 52 and third rake face 53 are smoothly connected to each other. Therefore, the magnitude of the gradient of the maximum principal stress can be reduced in a rake face. As a result, breakage resistance is improved.

Further, according to cutting insert 100 according to the present embodiment, third rake face 53 may have first region 1 contiguous to first rake face 51 and second region 2 contiguous to second rake face 52. In the cross section perpendicular to bottom surface 60 and intersecting each of major cutting edge portion 82 and wiper cutting edge portion 81, first region 1 may have a protruding shape and second region 2 may have a recessed shape. Thus, the curl diameter of swarf generated during cutting can be made small, thereby improving a swarf discharging characteristic.

Further, according to cutting insert 100 according to the present embodiment, first distance D1 may be 1.2 or more times and 6 or less times as large as second distance D2, first distance D1 being defined as the distance between second end 85 and boundary point 4 between boundary line 3 and major cutting edge portion 82 in the direction parallel to bottom surface 60 and parallel to major cutting edge portion 82 when viewed in the direction perpendicular to bottom surface 60, second distance D2 being defined as the distance between second end 85 and first end 86 in the direction parallel to bottom surface 60 and parallel to major cutting edge portion 82 when viewed in the direction perpendicular to bottom surface 60. With first distance D1 being 1.2 or more times as large as second distance D2, the breakage resistance can be improved. With first distance D1 being 6 or less times as large as second distance D2, the swarf discharging characteristic can be improved.

Further, according to cutting insert 100 according to the present embodiment, in the cross section perpendicular to bottom surface 60 and inclined by 25° with respect to wiper cutting edge portion 81, third rake face 53 may be provided with the recess having the arc shape, and curvature radius R of the recess may be 0.5 or more times as large as first distance D1. Thus, the breakage resistance can be improved.

Further, according to cutting insert 100 according to the present embodiment, the rake angle of second rake face 52 may be larger than the rake angle of first rake face 51. Thus, the swarf discharging characteristic can be improved.

Example

Next, the following describes a simulation result of gradient of maximum principal stress in a rake face.

Figure 9:
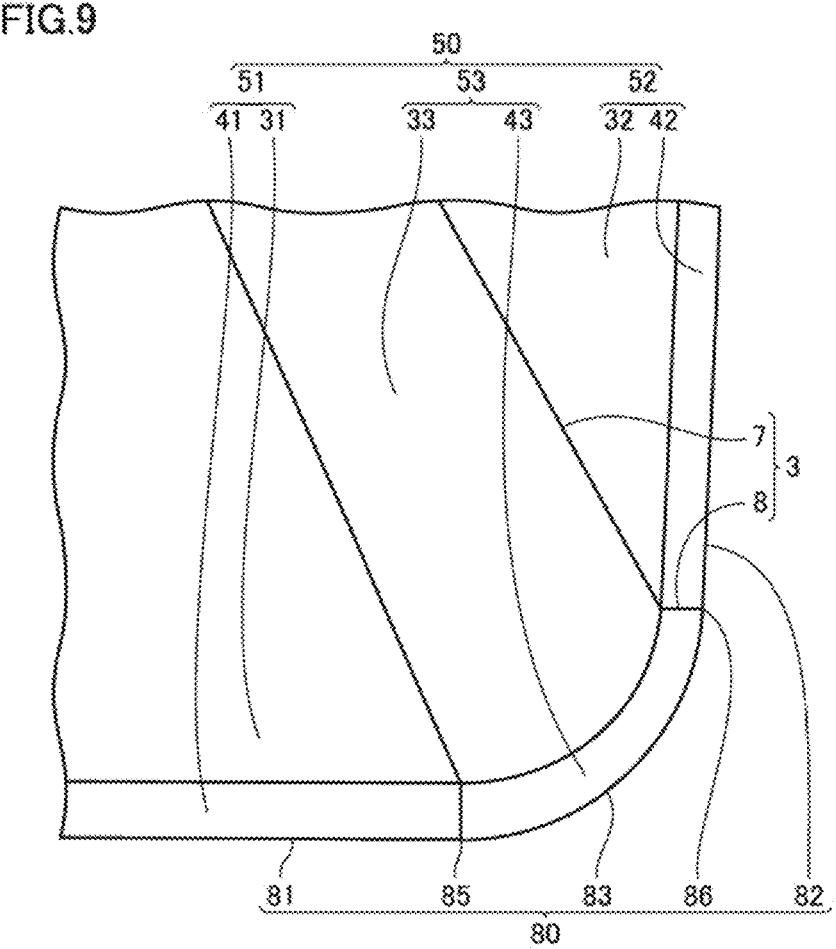
FIG. 9 is a schematic plan view showing a configuration of a cutting insert according to a comparative example.

First, simulation models of cutting inserts 100 according to samples 1 and 2 were produced. Cutting insert 100 according to sample 1 is an example of the present disclosure and has the shape shown in FIG. 6. Cutting insert 100 according to sample 2 is a comparative example and has a shape shown in FIG. 9. As shown in FIG. 9, in cutting insert 100 according to sample 2, boundary line 3 between second rake face 52 and third rake face 53 is contiguous to first end 86.

Each of the simulation models of cutting inserts 100 according to samples 1 and 2 was used to calculate the gradient of the maximum principal stress in the rake face. As simulation software, NX8.0 provided by SIEMENS was used. A load was applied to a range with a width of 0.2 mm and a height of 3 mm along major cutting edge portion 82 and first end 86. The direction of the load was perpendicular to bottom surface 60. The load was 1000 N. A feed amount per cutting edge (fz) was assumed to be 0.2 mm/tooth. A mesh size was 0.05 mm.

TABLE 1

| Sample Number | Maximum Value of Gradient of Maximum Principal Stress |
|---|---|
| Sample 1 | 732 MPa/mm |
| Sample 2 | 1478 MPa/mm |

Table 1 shows the maximum value of the gradient of the maximum principal stress in the rake face of each of cutting inserts 100 according to samples 1 and 2. As shown in Table 1, the maximum value of the gradient of the maximum principal stress in the rake face of cutting insert 100 according to sample 1 was 732 MPa/mm. On the other hand, the maximum value of the gradient of the maximum principal stress in the rake face of cutting insert 100 according to sample 2 was 1478 MPa/mm. From the above results, it was confirmed that the gradient of the maximum principal stress in the rake face can be reduced in cutting insert 100 according to sample 1 as compared with cutting insert 100 according to sample 2.

The embodiments and examples disclosed herein are illustrative and non-restrictive in any respect. The scope of the present invention is defined by the terms of the claims, rather than the embodiments described above, and is intended to include any modifications within the scope and meaning equivalent to the terms of the claims.

REFERENCE SIGNS LIST

1: first region; 2: second region; 3: second boundary line (boundary line); 4: boundary point; 5: first boundary line; 6: third boundary line; 7: first straight line portion; 8: second straight line portion; 9: insert mounting hole; 10: cut surface; 11: first region rake face portion; 12: second region rake face portion; 21: first region land portion; 22: second region land portion; 31: first rake face portion; 32: second rake face portion; 33: third rake face portion; 34: fourth rake face portion; 41: first land portion. 42: second land portion; 43: third land portion; 44: fourth land portion; 50: upper surface; 51: first rake face; 52: second rake face; 53: third rake face; 54: fourth rake face; 55: central flat portion; 60: bottom surface; 61: recess; 70: side surface; 72: first side surface portion; 73: third side surface region; 74: first side surface region; 75: second side surface portion; 76: second side surface region; 80: ridgeline; 81: wiper cutting edge portion; 82: major cutting edge portion; 83 nose cutting edge portion; 84: sub cutting edge portion; 85: second end; 86: first end; 87: third end; 100: cutting insert; D1: first distance; D2: second distance; R: curvature radius; X: short side direction; Y: long side direction; $\theta 1$: first rake angle; $\theta 2$: second rake angle; $\theta 3$: third inclination angle; $\theta 4$: fourth inclination angle; $\theta 5$: fifth inclination angle; $\theta 6$: sixth inclination angle.

The invention claimed is:

1. A cutting insert comprising:
a top surface;
a bottom surface opposite to the top surface; and
a side surface contiguous to each of the top surface and the bottom surface,
wherein
a ridgeline between the top surface and the side surface includes
a nose cutting edge portion having a curved line shape, the nose cutting edge portion having a first end and a second end opposite to the first end,
a major cutting edge portion contiguous to the first end, and
a wiper cutting edge portion contiguous to the second end,
the top surface includes
a first rake face contiguous to the wiper cutting edge portion,
a second rake face contiguous to the major cutting edge portion,
a third rake face contiguous to the nose cutting edge portion and contiguous to each of the first rake face and the second rake face, and
a boundary line between the second rake face and the third rake face is separated from the first end and is contiguous to the major cutting edge portion,
wherein
the third rake face has a first region contiguous to the first rake face and a second region contiguous to the second rake face, and
in a cross section perpendicular to the bottom surface and intersecting each of the major cutting edge portion and the wiper cutting edge portion, the first region has a protruding shape and the second region has a recessed shape.

2. The cutting insert according to claim 1, wherein a first distance is 1.2 or more times and 6 or less times as large as a second distance, the first distance being defined as a distance between the second end and a boundary point between the boundary line and the major cutting edge portion in a direction parallel to the bottom surface and parallel to the major cutting edge portion when viewed in a direction perpendicular to the bottom surface, the second distance being defined as a distance between the second end and the first end in the direction parallel to the bottom surface and parallel to the major cutting edge portion when viewed in the direction perpendicular to the bottom surface.

3. The cutting insert according to claim 1, wherein a rake angle of the second rake face is larger than a rake angle of the first rake face.

4. A cutting insert comprising:
a top surface;
a bottom surface opposite to the top surface; and
a side surface contiguous to each of the top surface and the bottom surface, wherein
a ridgeline between the top surface and the side surface includes
a nose cutting edge portion having a curved line shape, the nose cutting edge portion having a first end and a second end opposite to the first end,
a major cutting edge portion contiguous to the first end, and
a wiper cutting edge portion contiguous to the second end,
the top surface includes
a first rake face contiguous to the wiper cutting edge portion,
a second rake face contiguous to the major cutting edge portion, and
a third rake face contiguous to the nose cutting edge portion and contiguous to each of the first rake face and the second rake face, and
a boundary line between the second rake face and the third rake face is separated from the first end and is contiguous to the major cutting edge portion,
wherein a first distance is 1.2 or more times and 6 or less times as large as a second distance, the first distance being defined as a distance between the second end and a boundary point between the boundary line and the major cutting edge portion in a direction parallel to the bottom surface and parallel to the major cutting edge portion when viewed in a direction perpendicular to the bottom surface, the second distance being defined as a distance between the second end and the first end in the direction parallel to the bottom surface and parallel to the major cutting edge portion when viewed in the direction perpendicular to the bottom surface, in a cross section perpendicular to the bottom surface and inclined by 25° with respect to the wiper cutting edge portion, the third rake face is provided with a recess having an arc shape, and a curvature radius of the recess is 0.5 or more times as large as the first distance.

5. The cutting insert according to claim 4, wherein the third rake face has a first region contiguous to the first rake face and a second region contiguous to the second rake face, and in a cross section perpendicular to the bottom surface and intersecting each of the major cutting edge portion and the wiper cutting edge portion, the first region has a protruding shape and the second region has a recessed shape.

6. The cutting insert according to claim 4, wherein a rake angle of the second rake face is larger than a rake angle of the first rake face.

* * * * *